E. L. McBRIDE.
COOK STOVE.
APPLICATION FILED NOV. 12, 1918.
1,301,582.
Patented Apr. 22, 1919.
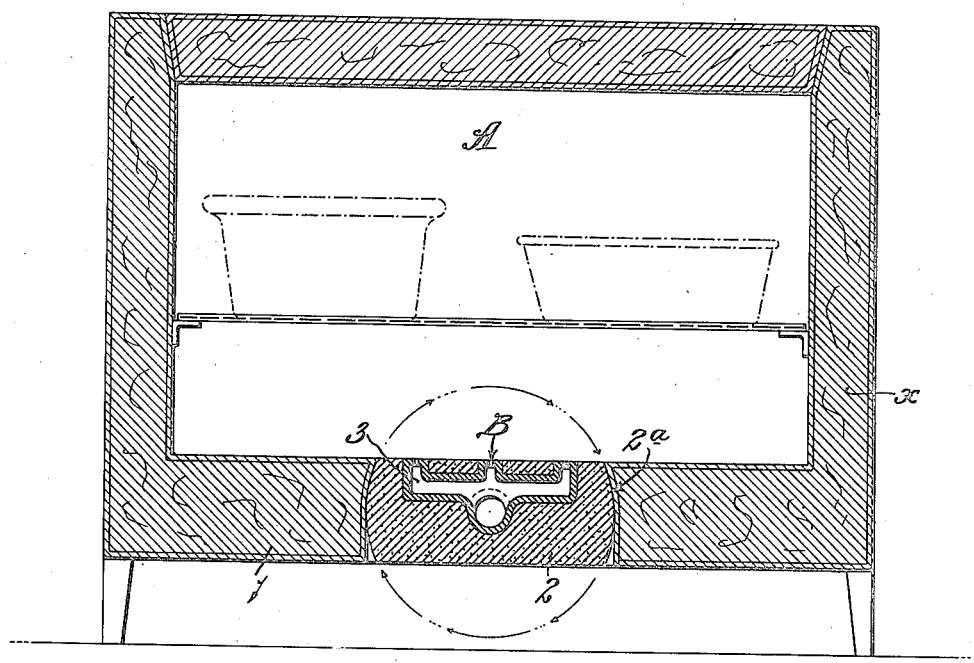
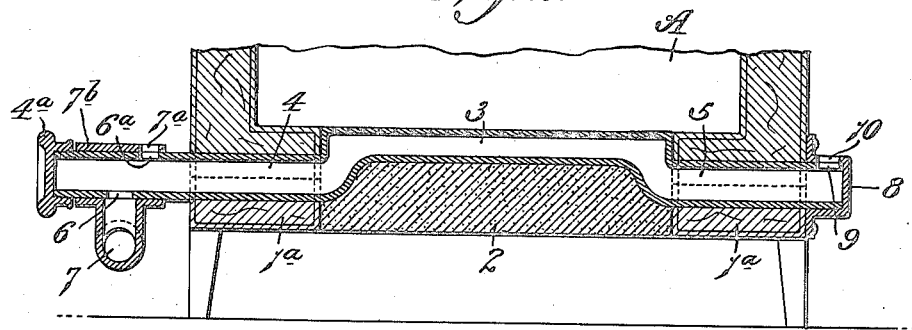
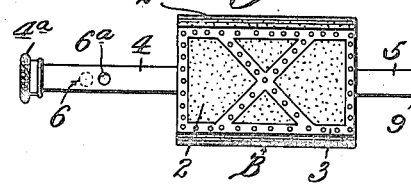
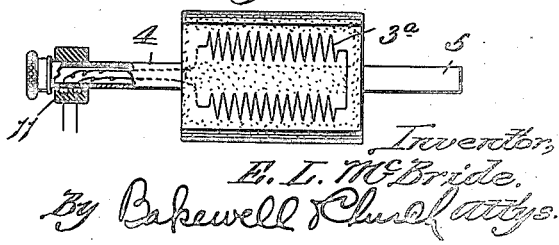
Inventor,
E. L. McBride.
By Bakewell & Church, attys.

UNITED STATES PATENT OFFICE.

EDWARD L. McBRIDE, OF ST. LOUIS, MISSOURI.

COOK-STOVE.

1,301,582.  Specification of Letters Patent.  Patented Apr. 22, 1919.

Application filed November 12, 1918. Serial No. 262,182.

*To all whom it may concern:*

Be it known that I, EDWARD L. MCBRIDE, a citizen of the United States, residing at St. Louis, Missouri, have invented a certain new and useful Improvement in Cook-Stoves, of which the following is a full, clear, and exact description, such as will enable others skilled in the art to which it appertains to make and use the same.

This invention relates to cook stoves of the type which comprise a heat insulated oven or food chamber equipped with a preheater.

One object of my invention is to provide an inexpensive cook stove of the general type referred to that is equipped with a preheater which can be moved easily into and out of operative position and which is so constructed that heat cannot escape from the food chamber through or around the preheater when the preheater is arranged in its inoperative position.

Another object is to provide a fireless cooker or similar type cook stove in which the food compartment has adjustably mounted in one wall thereof a preheater that comprises a body portion of heat retaining material and a heating device embedded in said body portion.

And still another object of my invention is to provide a fireless cooker or similar type cook stove whose food chamber is provided in its bottom with an opening in which a preheater is rotatably mounted in such a manner that when arranged in one position it will supply heat directly to said chamber or to a food receptacle in said chamber, and when arranged in a different position it will form an air tight closure for the opening in the bottom of the food chamber. Other objects and desirable features of my invention will be hereinafter pointed out.

Figure 1 of the drawings is a vertical sectional view of a cook stove constructed in accordance with my invention.

Fig. 2 is a vertical sectional view, taken at right angles to Fig. 1.

Fig. 3 is a top plan view of the preheater; and

Fig. 4 is a top plan view of a preheater of slightly different form than the one shown in Fig. 3.

Referring to the drawings which illustrate the preferred form of my invention, A designates an oven or food chamber of any preferred construction, but preferably a chamber whose walls are heat insulated, the chamber A herein shown having hollow side walls and hollow top and bottom walls that are filled with heat insulating material $x$. The food chamber A is provided with a preheater B that is adjustably mounted in an opening in one of the walls of said chamber in such a manner that when it is arranged in one position it will supply heat to said chamber, and when it is arranged in a different position it will form an air-tight closure for the opening in which it is arranged. I prefer to arrange the preheater B in the opening in the bottom 1 of the food chamber A and provide said preheater with a body portion 2 formed of soapstone or other suitable heat retaining material, and a heating device 3 that is embedded, or partially embedded, in said body portion 2. I also prefer to mount the preheater B in such a manner that it will revolve about a horizontal axis and provide the body portion 2 of same with curved surfaces $2^a$ that are arranged concentric with relation to the axis of rotation of the preheater and which bear snugly against coöperating curved surfaces at the side edges of the opening in the bottom of the food chamber, both when the heating device 3 is arranged in operative position and in inoperative position, thus causing the body portion 2 of the preheater to serve as an air-tight closure for the opening in which it is arranged during the operation of preheating the food chamber and after the preheater has been turned into its inoperative position.

In the form of my invention herein shown the body portion 2 of the preheater consists of a substantially oblong-shaped member formed of soapstone or other suitable heat retaining material that is substantially of the same thickness as the bottom 1 of the food chamber, said member being provided at its opposite ends with trunnions that are journaled in the bottom wall of the food chamber A. It is immaterial, so far as my broad idea is concerned, what the heating device of the preheater consists of. It can either consist of a gas burner 3, as shown in Figs. 1, 2 and 3, or an electric heating element $3^a$, as shown in Fig. 4. When a gas burner 3 is used it is preferable to embed the burner in the heat retaining member 2 that constitutes the body portion of the preheater, so that the top of the burner will be flush or approximately so with the horizontal surface of the member 2 in which the burner is embedded. The burner 3 is provided at its opposite ends with two horizontally-disposed pipes 4 and 5 that serve as trunnions for the preheater, said pipes being journaled in the bottom 1 of the chamber A, as shown in Fig. 2. Any method may be used for rotatably mounting the preheater, but when the preheater is provided with integral trunnions, as shown herein, the bottom 1 of the food chamber is provided with removable portions 1ª that constitute the lower members of split bearings in which the pipes 4 and 5 are journaled.

The pipe 4 is provided at its outer end with a knob or finger-piece 4ª, so as to enable the preheater B to be turned over by simply grasping the knob 4ª and turning same. Said pipe 4 is also provided with a gas inlet port 6 and an air port 6ª that register with a port in a gas supply pipe 7 and with an air port 7ª in a bearing 7ᵇ, respectively, when the preheater is arranged in its operative position, shown in Fig. 2. The pipe 5 at the other end of the burner 3 projects into a cap 8 and the projecting portion of said pipe is provided with an air port 9 that registers with an air port 10 in the cap 8 when the burner is in use, the air ports above referred to providing a sufficient supply of air to the burner to support combustion and to ventilate the food chamber. When the burner 3 is moved into its inoperative position, by turning the body portion 2 of the preheater over, the gas port in the pipe 4 moves out of registration with the port in the gas supply pipe 7, and the air ports 6ª and 9 in the pipes 4 and 5, respectively, move out of registration with the air ports in the bearing 7ᵇ and in the cap 10, thus automatically cutting off the supply of gas to the burner and also cutting off communication between the interior of the food chamber A and the atmosphere. When the burner is in use some of the heat that radiates from same will be absorbed by the heat retaining member 2 in which the burner is embedded, and after the burner has been moved into its inoperative position by revolving the member 2, the heat which said member absorbed will radiate upwardly into the food chamber. It will thus be seen that my improved cook stove is provided with a device, which, when arranged in one position, will supply heat directly to the food chamber and to the food receptacle therein, and which, when arranged in a different position, will supply some additional heat to the food chamber for a considerable period after the heating device has been cut out of service, due, of course, to the fact that the body portion 2 of the preheater is formed of heat retaining material. Furthermore, there is no liability of heat escaping from the food chamber through or around the preheater, as the body portion of the preheater consists of a heat retaining member of substantially the same thickness as the bottom of the food chamber which is so shaped and arranged that it bears snugly against the edges of the opening in the bottom of the food chamber in which it is positioned. The side edges of the opening in the bottom of the food chamber that receives the preheater B are so shaped that the preheater can be slipped upwardly into said opening, and the bottom of said chamber is provided with removable portions 1ª, as previously stated, that form parts of the bearings in which the trunnions on the preheater are arranged, thereby permitting the preheater to be easily arranged in operative position.

When the preheater is provided with an electric heating element, as shown in Fig. 4, it is preferable to control the supply circuit by means of a switch, designated by the reference character 11 in Fig. 4, which is so arranged that the supply circuit will be closed automatically when the preheater is turned so as to arrange the heating element on the upper side of the body portion 2 of the preheater, and which will be opened automatically when said preheater is turned into its other position.

A fireless cooker or cook stove of the construction above described has many features which make it superior to the cook stoves of this general type heretofore in use; it is provided with a preheater which is so constructed and arranged that heat cannot escape from the food chamber through or around the preheater; the preheater is so constructed that it does not obstruct the interior of the food chamber either when said preheater is in use or not in use; the preheater is of such a character that it will supply some heat to the food chamber for a considerable period after the heating device has been cut out of service and the preheater can be moved easily into and out of operative position by simply turning the knob 4ª. In addition to the desirable features pointed out, my improved cook stove is of such simple design that it can be manufactured at a low cost; it is not apt to get out of order easily and it is so constructed that the operation of moving the preheater into its operative position automatically turns on the medium that produces the heat, and the operation of turning the preheater into its inoperative position automatically cuts off the supply of the heat producing medium.

Having thus described my invention, what I claim and desire to secure by Letters is:

1. A cook stove, comprising an oven or chamber provided in one of its outer walls with an opening, a member rotatably mounted in said wall so as to form an air-tight closure for said opening, and a heating device in said member for supplying heat to said chamber or oven when said member is in one position, said member being adapted to be turned over so as to render said heating device inoperative.

2. A cook stove, comprising a food chamber or oven having insulated outer walls, one of which is provided with an opening, a member formed of heat retaining material rotatably mounted in said opening and adapted to be arranged in two different positions, in either of which it forms an airtight closure for said opening, and a heating device in said member that supplies heat to said oven when said member is in one of its positions.

3. A cook stove, comprising a food chamber or oven having insulated walls, one of which is provided with a substantially oblong-shaped opening, a member of heat retaining material rotatably mounted in said opening and being of substantially the same thickness as the wall in which the opening is formed, and a heating device embedded in said member for supplying heat to said chamber when said member is in one of its positions.

4. A cook stove, comprising an oven or food chamber, one of whose outer walls is provided with a substantially oblong-shaped opening whose side edges are curved, a member of heat insulating material rotatably mounted in said opening and provided with curved surfaces at its side edges that bear snugly against the curved side edges of said opening, and a heating device in said member that is adapted to be rendered operative by turning said member over.

5. A food chamber or oven provided in one of its walls with a substantially oblong-shaped opening, an air-tight closure for said opening formed by a rotatable member provided with trunnions that are journaled in the wall in which the opening is formed, and a heating device combined with said member and adapted to supply heat to said oven when said member is in one of its normal positions.

6. A cook stove, comprising a food chamber or oven having insulated outer walls, one of which is provided with a substantially oblong-shaped opening having curved side edges, a tight closure for said opening consisting of a member formed of heat insulating material and provided with curved surfaces that bear against the curved edges of said opening when said member is in either one of its two positions, tubular trunnions on the ends of said member that are journaled in the wall in which the opening is formed, a gas burner embedded in one face of said member, a gas inlet pipe communicating with the trunnion at one end of said member, a stationary cap into which the trunnion at the other end of said member projects, and coöperating openings in said cap and in the trunnion that projects into same which register when said member is arranged in such a position that the gas burner in same is positioned within the oven.

EDWARD L. McBRIDE.